United States Patent [19]
Rutten et al.

[11] 3,913,528
[45] Oct. 21, 1975

[54] SELF-PROPELLED FEEDER

[75] Inventors: Donald E. Rutten, Plainfield; Richard A. Davis, Joliet, both of Ill.

[73] Assignee: P & D Manufacturing Co., Inc., Plainfield, Ill.

[22] Filed: May 28, 1974

[21] Appl. No.: 473,496

[52] U.S. Cl. .............................................. 119/52 B
[51] Int. Cl.² ......................................... A01K 5/02
[58] Field of Search......... 119/52, 53, 52 B; 198/67, 198/112; 222/409, 415, 351

[56] References Cited
UNITED STATES PATENTS
3,428,027  2/1969  Haen ................................. 119/52 B
3,695,415  10/1972  Bakker ............................. 119/52 B Primary Examiner—Louis G. Mancene
Assistant Examiner—Peter K. Skiff
Attorney, Agent, or Firm—Molinare, Allegretti, Newitt & Witcoff

[57] ABSTRACT

An improved animal feeder that permits a manufacturer to use standard elevator material in construction thereof. This improved feeder includes, in one embodiment, an elongated feed carrier mounted for movement on a guide track having a continuous conveyor loop longitudinally encircling the trough of said carrier wherein the loop has a fixed point beneath the trough to provide relative movement between the carrier and loop when the carrier is moved. The fixed point of the loop is held by a stationary support member extending longitudinally below the carrier trough thereby enabling the use of standard elevator material in the construction of the feeder.

Also disclosed is a baffle device which is positioned over the dead spot of a conventional reciprocating or oscillating animal feeder to deflect any feed away from the dead spot thereby insuring that all feed passed to the feeder is discharged therefrom.

28 Claims, 12 Drawing Figures

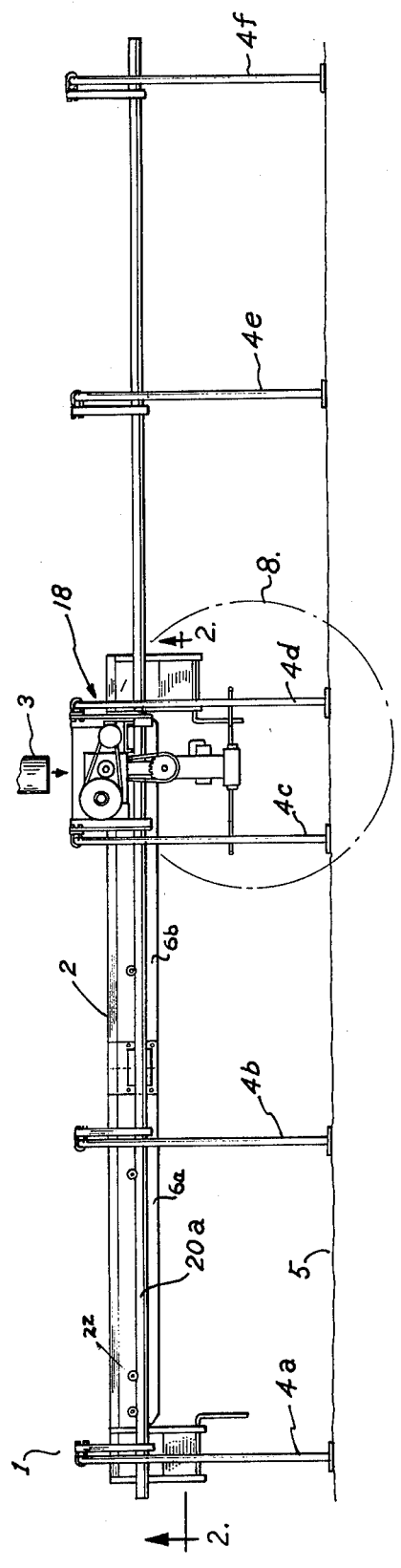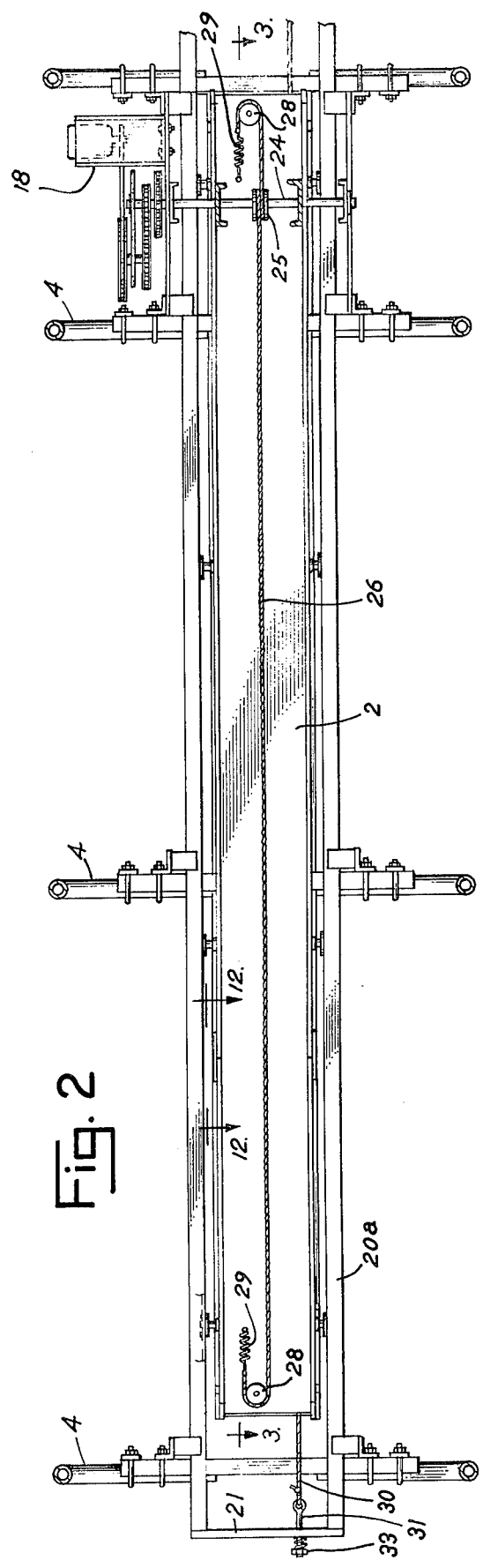

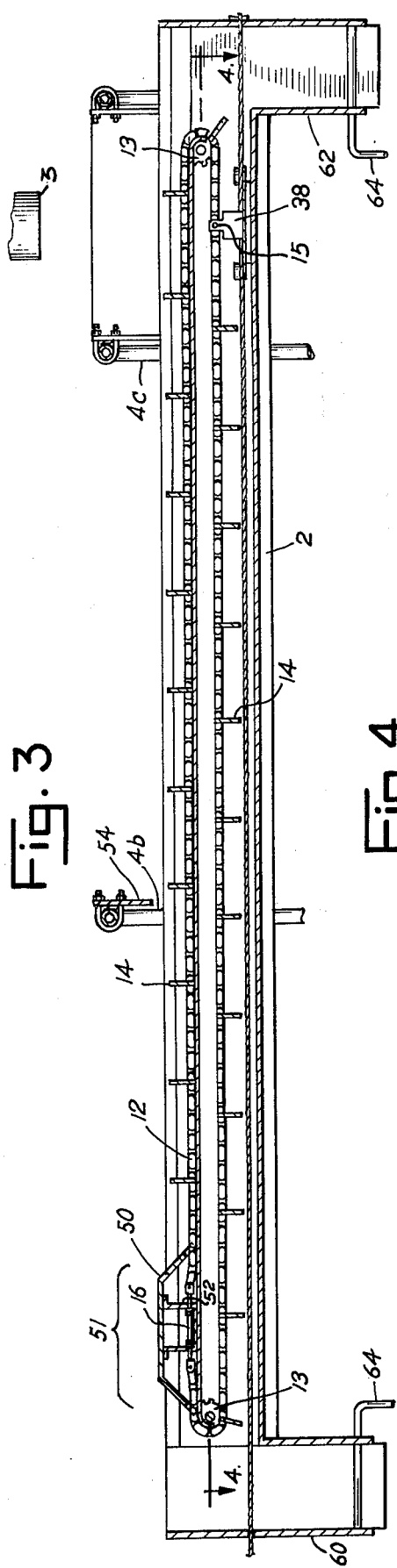
Fig. 3
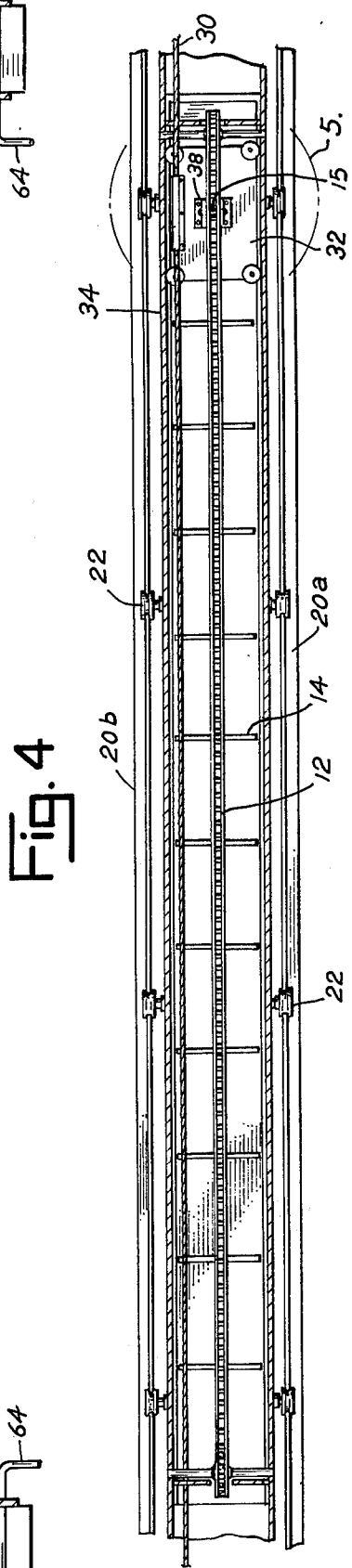
Fig. 4
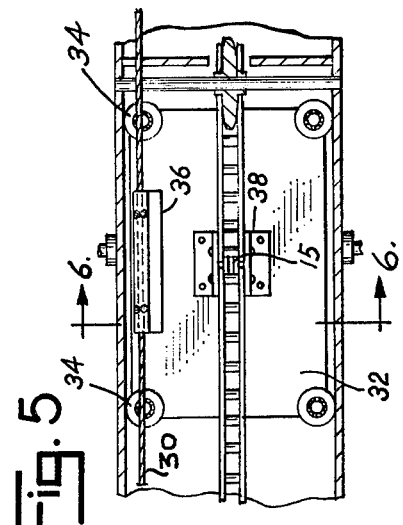
Fig. 5
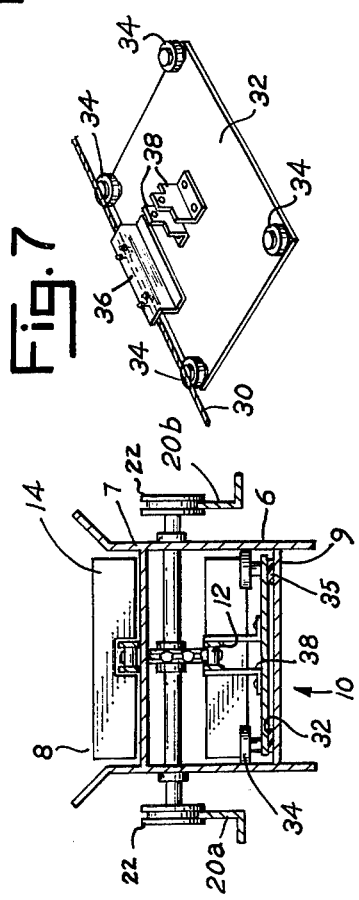
Fig. 7
Fig. 6
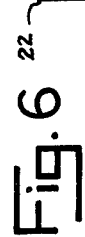

SELF-PROPELLED FEEDER

BACKGROUND OF THE INVENTION

This invention relates to animal feeders, particularly animal feeders that are of the oscillating or reciprocating type that have a feed carrier that moves back and forth above a feed area to deposit feed therein for consumption by livestock.

Reciprocating or oscillating animal feeders which deposit animal feed into a feed area from a feed carrier positioned over the feed area are known to the art. A common feeder includes a guide track, supported on the feed bunk or suspended from the ceiling which supports a movable elongated feed carrier above a feed area having a length about twice the length of the movable feed carrier. This feed carrier has a trough to receive feed material from a supply source positioned at the mid-point of the feed area, and a continuous conveyor loop longitudinally encircling the trough to remove feed from the carrier trough. This conveyor loop, which is typically a standard flexible conveyor belt or a chain containing spaced-apart flights, has a fixed point, beneath the feed trough, and usually at the mid-point of the feed area, which produces relative movement between the conveyor loop and the trough when the feed carrier is moved. As a result, the conveyor loop due to relative movement between the conveyor and the moving trough, expels feed from the end of the feed carrier into the feed area over substantially the entire length of the feed area in response to the reciprocating movement of the feed carrier.

The conveyor loop of the prior art devices is fixed, at the mid-point of the feed carrier, to an immovable vertical extending support rod or to an immovable laterally extending support brace positioned below the trough of the feed carrier. However, since the feed carrier moves relative to the fixed support point for the conveyor loop, that portion of the feed carrier immediately below the trough cannot be enclosed. In other words, by using the prior art support structures, a standard elevator, comprising an open top trough section and an enclosed bottom conduit section, could not be used as a feed carrier unless the bottom conduit section is provided with a longitudinally extending opening to allow the fixed support for the conveyor loop to pass through and permit movement of the elevator.

In addition, reciprocating animal feeders have a "dead spot" in the trough where the feed deposited therein is not discharged from the feeder. This dead spot, in the case of a feeder having a continuous conveyor loop positioned longitudinally around the feed trough of the feeder, is due to the inability of the feeder to move a distance exactly twice its length, i.e., the length of the conveyor loop, because of mechanical limitations. As a consequence, feed continues to accumulate in the dead spot and spills over the side of the trough. Since the portion of the feed in the dead spot is not discharged from the conveyor, spoilage of the feed occurs.

For example, a typical feed trough is powered by engagement of a cable positioned on the bottom of the trough with a fixed rotating pulley. The ends of the cable, however, are connected to the trough and it is impossible for the pulley to engage the cable along its entire length. As a consequence the trough cannot move a distance exactly twice its length which is necessary to eliminate any dead spots. Another cause of dead spots, due to the inability of the trough to reciprocate the necessary distance, is the fixed support structure for the discharge conveyor loop. This support structure frequently leads to dead spots of up to four feet or more in length.

SUMMARY OF THE INVENTION

It is an object of this invention to provide an improved means for affixing a conveyor loop, longitudinally encircling the trough of a movable elongated feed carrier, below the trough to provide a fixed point for said conveyor and to allow relative movement between the carrier and the trough.

It is another object of this invention to provide a means for affixing a conveyor loop, longitudinally encircling the trough of a standard elevator, in the closed conduit beneath said trough without the necessity of creating a longitudinal opening in the walls or base of said conduit.

It is another object of this invention to provide a means for affixing a conveyor loop, longitudinally encircling the trough of an elongated feed carrier to minimize the length of the dead spot in the feed conveyor.

It is a further object of this invention to provide a baffle arrangement for eliminating the accumulation of feed in the dead spot of a feed conveyor.

It is a still further object of this invention to provide a baffle arrangement affixed to the conveyor loop longitudinally encircling the trough of an animal feeder to divert feed away from the dead spot on the loop and to prevent accumulation of feed therein.

In a broad embodiment therefore, the present invention relates to an improvement in an animal feeder to deposit animal feed into a feed area. The animal feeder has an elongated feed carrier mounted for movement on guide tracks extending along the feed area. The feed carrier has a trough to receive feed material from a feed source and a continuous conveyor loop, such as a flat conveyor belt or a chain carrying spaced-apart flights, longitudinally encircling the trough to remove feed therefrom. The conveyor loop is fixed at a point beneath the trough whereby movement of the feed carrier produces relative movement between the trough and the conveyor loop thereby discharging material from the end of the feed conveyor. The particular improvement of the present invention comprises a stationary support member extending longitudinally below the trough along the length of the guide track to which the fixed point of the conveyor loop is attached. This improved method for affixing the fixed point of the conveyor loop allows a manufacturer to build a feed carrier from one or more lengths of standard elongated elevator having an open trough top section and an enclosed bottom conduit section without having to provide a longitudinal opening in the walls or the bottom of the conduit section of the elevator to permit movement of the elevator relative to the fixed conveyor point. Preferably, the longitudinal support member comprises a cable connected to each end of the supporting frame structure for the animal feeder. This cable, in turn, is connected to a support plate having an anti-friction surface such as guide wheels positioned on the side edges of the plate to prevent engagement of the plate with the side walls of the enclosed bottom conduit portion of the elevator. In addition, an anti-friction surface such as a plastic with an inherent low coefficient of friction (i.e., Nylon or Teflon) is positioned on the bottom of the plate to minimize friction between the plate and the bottom of the enclosed conduit portion of the elevator.

Another aspect of this invention relates to a device that eliminates the accumulation of feed material in the trough of a feed carrier due to the inability of the feed carrier to move a distance along the feed area sufficient to discharge all of the material deposited therein, thereby creating a movable dead spot in the trough. This dead spot is eliminated by positioning a baffle over the dead spot to prevent feed from accumulating therein. This baffle is positioned stationary relative to the movable dead spot. In a preferred embodiment, when the mechanism to remove the feed from the feed carrier is a continuous conveyor loop longitudinally encircling the trough and having a fixed point beneath the trough, the baffle is affixed to said loop and extends over said dead spot a height greater than the feed height in the trough. Preferably, the baffle is a substantially horizontal baffle having downwardly turned forward and rear edges to prevent accumulation of feed beneath the baffle and a stationary scraper to remove feed deposited on the horizontal baffle surface after the baffle passes beneath the scraper. Preferably the edges of the baffle extend over the side edges of the trough.

Other objects and embodiments will become apparent from the following detailed description of the preferred embodiment of the present invention.

BRIEF DESCRIPTION OF THE DRAWINGS

FIG. 1 is a side view of the improved animal feeder assembly of the present invention.

FIG. 2 is an enlarged bottom view of the animal feeder trough illustrated in FIG. 1.

FIG. 3 is an enlarged, side sectional view of the feed carrier trough illustrated in FIG. 1 taken along section line 3—3 of FIG. 2.

FIG. 4 is a detailed bottom sectional view of the animal feeder trough illustrated in FIG. 1 taken along section line 4—4 of FIG. 3.

FIG. 5 is an enlarged plan view of the plate utilized to connect the fixed point of the conveyor loop to a longitudinally positioned cable passing parallel to the bottom of the conveyor loop.

FIG. 6 is a detailed transverse sectional view of the feed conveyor illustrated in FIG. 1 taken along section line 6—6 of FIG. 5.

FIG. 7 is a detailed perspective view of the plate illustrated in FIG. 5.

DESCRIPTION OF PREFERRED EMBODIMENTS

Figure 8:
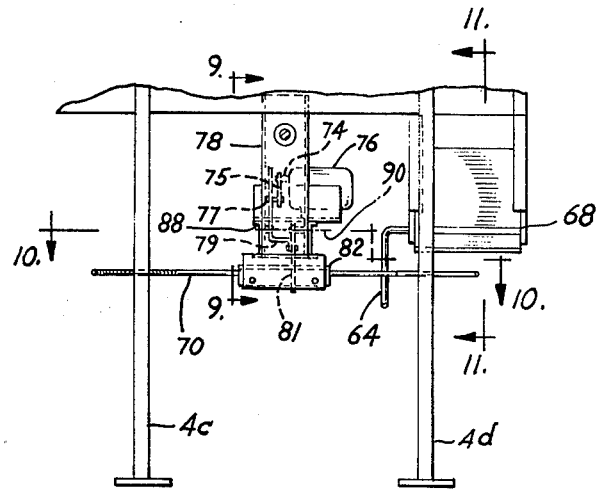
FIG. 8 is a detailed side view of the operative mechanism to change the discharge direction of the chutes positioned on the ends of the feed conveyor illustrated in FIG. 1.
Figure 9:
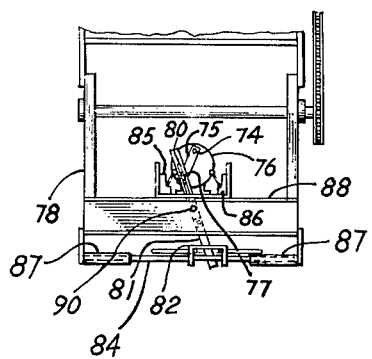
FIG. 9 is a detailed cross-sectional view of the mechanism to laterally move the operative mechanism of FIG. 8 taken along section line 9—9 of FIG. 8.

Referring first to FIGS. 1 and 2, there is illustrated an animal feeder trough 2, suspended, by means known to those trained in the art, comprising frame structure 1, end support arms 4a and 4f, intermediate support arms 4b and 4e, center support arms 4c and 4d, side rails 20a and 20b, and end support members 21. More particularly, as illustrated, feeder trough 2 comprises two interconnected sections of standard elevator 6a and 6b defining a top trough section 8 and a bottom closed conduit section 10 (FIG. 6). However, feed trough 2 can comprise a single section of elevator as well as more than two sections of elevator.

Figure 12:
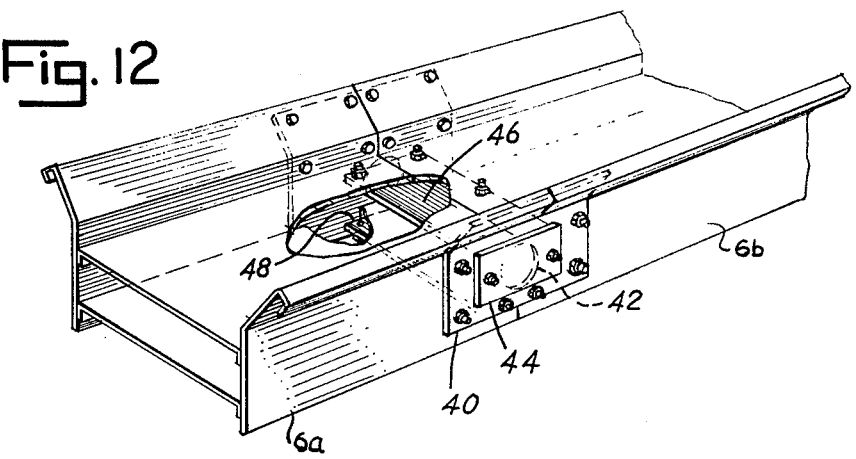
FIG. 12 is a detailed side view of the animal feeder of FIG. 1 illustrating the interconnection of the elevators used to form the animal feeder.

Referring to FIG. 12, elevators 6a and 6b are rigidly connected by side splice brackets 40 positioned on either side of the interconnection between elevators 6a and 6b and horizontal splice brackets 46 and 48 interconnecting the top and bottom walls 7 and 9, respectively, of elevators 6a and 6b. Opening 42 in side splice bracket 40 provides access to the interior of closed conduit section 10 for installation and maintenance. Opening 42 is covered by access plate 44 once the feeder is installed and operating.

Support wheels 22 are positioned on either side of feeder trough 2 and engage side rails 20a and 20b to allow for movement along the length of the side rail.

A fixed drive mechanism 18 mounted at the midepoint of the side rails 20a and 20b between center supports 4c and 4d drives axle 24 (FIG. 2) which in turn is connected to drive cable 26 beneath feeder 2 by pulley 25. Although a single cable 26 and pulley 25 are illustrated, for long feeder troughs (i.e., over about 75 feed in length), two parallel drive cables 26 connected to two spaced-apart pulleys 25 are generally used for operational efficiency.

As illustrated, single drive cable 26 passes around end pulley 28 positioned at each end of the bottom of the feeder 2 and is rigidly affixed to the end of spring 29. The rotation of drive axle 24 by drive mechanism 18 causes the pulley 25 to frictionally engage and pull against the fixed drive cable thereby causing feeder 2 to move along guide rails 20a and 20b. Springs 29 prevent the imposition of sudden forces on cable 26 when drive member 18 is started thereby avoiding snapping of the cable.

Referring to FIGS. 3 and 6, a chain 12 longitudinally encircles wall 7 that separates trough 8 from enclosed bottom conduit 10. Chain 12 passes around and engages the teeth of rotatable gear 13 positioned at each end of the feeder. Chain 12 forms a continuous loop through the interconnection of the opposite ends of the chain by turnbuckle 16. Flights 14 are positioned at spaced-apart distances along the entire length of chain 12 to form a continuous conveyor loop cable for discharging feed from trough section 8.

Chain 12 has a fixed point 15 positioned at the middle of the feed area 5 and between center support members 4c and 4d. More particularly, referring to FIGS. 4 and 5, chain 12 is connected to vertical brackets 38 affixed to plate 32. Plate 32 in turn is held in a stationary position relative to feeder trough 2 to cable 30 which extends longitudinally along one side of and within enclosed conduit 10 by connection with clamp or bracket 36. Although only one cable 30 is illustrated in certain embodiments (i.e., feeders having a length of more than about 75 feet), two cables may be used to keep plate 32 centered within enclosed conduit 10. Cable 30 is affixed in a stationary position to end frame member 21 extending laterally across each end of said rails 20a and 20b of frame structure 1 through eye bolt 31. Eye bolt 31 is provided with a spring 33 to absorb sudden forces which may be imposed on cable 30. As illustrated in FIG. 3, when feeder trough 2, formed from two interconnected elevator sections 6a and 6 b (more if desired) moves, chain 12 and flights 14 attached thereto move within trough 8 and discharge any feed passed to trough 8 through feed chute 3 out through discharge chute 62 when the feeder moves to the right and, through discharge chute 60, when the feeder moves to the left.

Referring in detail to FIGS. 5 and 7, plate 32 is substantially rectangular in form and has suitable antifriction means such as guide wheels 34 positioned at each corner of the plate. These guide wheels 34 prevent the sides and corners of plate 32 from engaging or rubbing against the side walls of conduit 10 as illustrated in FIG. 6. As a consequence, the edges of plate 32 do not engage the side walls of enclosed conduit 10 and feeder trough 2 can move freely relative to plate 32. Although guide wheels 34 are illustrated in the Figures, it is also within the scope of the present invention to use as a suitable anti-friction means rubbing strips positioned over the edge of the plate. In addition, antifriction strips 35 are positioned along the bottom edge of plate 32 to minimize frictional forces between the bottom of plate 32 and the bottom 9 of enclosed conduit 10. Preferably, the anti-friction strips are manufactured from a polymeric material having an inherently low coefficient of friction such as nylon or Teflon. Alternately strip 35 can be replaced by a wheel or bearing structure to minimize friction between the bottom of plate 32 and bottom 9.

As can be seen from FIGS. 3 through 7, cable 30 longitudinally positioned within enclosed conduit 10 and connected to chain 12 through plate 32 provides a fixed point 15 for conveyor chain 12. This interconnection allows a manufacturer of animal feeders to manufacture the feeder trough by the simple interconnection of two or more standard elevators. There is no need to provide continuous longitudinal openings along the entire length of the conduit section of the elevator to connect an external fixed point with the bottom of the conveyor chain thereby providing a fixed point for the conveyor loop. This is important since it allows a manufacturer to utilize a standard inventory item in the manufacture of his animal feeder. In addition, guide plate 32 and bracket 38 mounted thereon allow feed trough 2 to reciprocate back and forth along feed area 5 a distance almost twice its length since bracket 38 allows fixed point 15 of chain 12 to closely approach gear 13. This close approach of fixed point 15 to the ends of feed trough 2 lowers the length of dead spot within trough 2 to less than two feet in a typical commercial embodiment.

Figure 11:
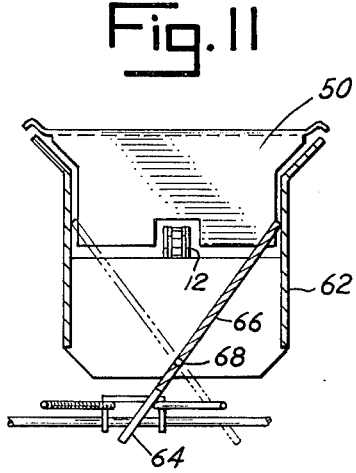
FIG. 11 is an end sectional view of the discharge chute taken along section line 11—11 of FIG. 3.

As can be seen in FIG. 2, feeder 2 cannot move to a point where the entire length of the conveyor lies to the left or right of the center line of feed chute 3. This is due to the fact that drive axle 24 mechanically interferes with the connection with drive cable 26 at either end of the feeder frame 2 and the inability of fixed point 15 of chain 12 to pass around gear 13. This results in a movable dead space 51 within trough 8 as illustrated in FIG. 3. This dead space is a fixed length in the conveyor chain and moves relative to the trough. Any feed deposited in this section of feed trough 2 when the trough moves beneath feed chute 3 will not be discharged from the end of the trough and down through chute 60 or 62 since the section of the chain within space 51 never passes around gear 13 positioned at each end of the feeder; hence the term "dead space". As illustrated in FIGS. 3 and 11, a horizontal baffle 50 is affixed to chain 12 through support brackets 52 above dead space 51 to prevent accumulation of feed therein. The forward edges of baffle 50 are bent downward to prevent any material from accumulating beneath the baffle. In addition, baffle 50 extends above the top feed height of trough 8 and extends over the side edges of the trough (FIG. 11). Any feed material that may accumulate on the top horizontal surface of baffle 50 is removed therefrom through the action of scraper blade 54 attached to either support arm 4a or 4b (or 4e or 4f, FIG. 3) when the conveyor frame moves beneath the support arm. Blade 54 can be either a rigid or flexible plate rigidly attached to a support arm, or it can be a movable or revolving removing device. Blade 54 can also be positioned on center arms 4c or 4d. However, this center position is not preferred because there is a large accumulation of feed on baffle 50 as it passes support arms 4c or 4d due to the proximity of feed chute 3. This accumulation is less at positions remote from arms 4c or 4d (i.e., 4a, 4b, 4e or 4f) and the stresses imposed on blade 54 at these points is less. Accordingly, any feed or silage that would customarily be deposited within dead space 51, is distributed fore and aft of baffle 50, thereby eliminating any dead spaces within the feeder. As a consequence, all feed material passed to the feeder is discharged therefrom through each feed cycle and there is no continuous accumulation within and, hence, spillings from feed trough 2. The elimination of accumulations within the feeder is important since this also eliminates spoilage which inevitably occurs when accumulations are present.

Discharge chutes 60 and 62 positioned at each end of feeder trough 2 contain an adjustable baffle 66 mounted on a rotatable rod having a center portion 68 and a downwardly extending control portion 64 to laterally direct feed material to the left or the right in feed area 5 as desired. Alternatively, baffle 66 can be removed and the feed material simply discharged directly downward within feed area 5.

Figure 10:
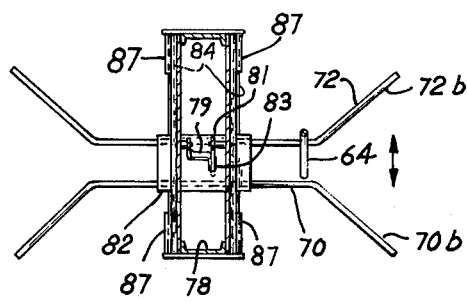
FIG. 10 is a plan view of the mechanism illustrated in FIG. 8.

The position of baffle 66 within discharge chutes 60 and 62 is controlled by the engagement of control portion 64 with bent portions 70b and 72b of rods 70 and 72 respectively. More particularly, control rods 70 and 72 are mounted for transverse movement on a horizontal plane beneath feed trough 2 on a pair of horizontal rods 84. As detailed hereinafter, rods 70 and 72 are actuated by a crank supported by brackets 78 between center support members 4c and 4d. In operation of discharge chutes 60 and 62, when baffle 66 must be positioned to discharge feed material in a right direction through chute 62, wherein the baffle had been previously positioned to discharge material in the opposite left direction, rods 70 and 72 are moved to the right side as illustrated in FIG. 10 and, as control rod 64 enters the Y formed by outwardly bend portion 70b and 72b of engaging rods 70 and 72, baffle 66 is rotated about center portion 68 thereby changing the discharge direction of the chute. When the operator of the feeder has discharged sufficient material to the right, rods 70 and 72 can be moved to the left side of feeder 2 and through the engagement of bent arm 70b with control portion 64 the position of baffle 66 is again changed.

This change in direction of baffle 66 can be accomplished in response to the reciprocal movement of feeder 2 on side rails 20a and 20b. By the proper adjustment of rods 70 and 72 the discharge direction can be changed through each cycle of operation. Alternatively, by maintaining rods 70 and 72 in a fixed position, the feed material can be discharged in a constant left or right direction to the exclusion of the other direction. This allows a farmer to provide good rationing of the feed material to his livestock.

Referring to FIGS. 8 – 11 the drive mechanism for rods 70 and 72 is illustrated in detail. Rods 70 and 72 are rigidly interconnected by bracket 82 and ride on horizontal support rods 82. Thus, horizontal support rods 84 supported by brackets 78 provide a horizontal guide track for rods 70 and 72 transversely positioned below feeder 2. Tubular stop members 87 are positioned on either side of bracket 78 and support rods 84 to limit the travel of bracket 82.

Drive shaft 74 of drive motor 76 is rigidly connected to first connecting member 75, which in turn is movably connected to a second connecting member 79 through bolt 77 passing through elongated slot 80 in member 79. As illustrated, bolt 77 does not rigidly connect members 78 and 79 and permits relative vertical movement therebetween. The lower portion of second connecting member 79 is pivotally connected at point 90 to the center of cross support 88 and has connected thereto third connecting member 81 which engages lateral slot 83 in bracket 82.

In operation of the drive mechanism, the rotation of first connecting member 75 is transmitted to second and third connecting members 79 and 81 thereby causing connecting member 81 to rotate along a predetermined arc correlated to the distance rods 70 and 72 are to move. The rotational movement of connecting member 81 causes control rods 70 and 72 to oscillate horizontally along transverse rods 84. Switches 85 and 86 are positioned to engage the upper portion of connecting member 79 and to terminate the power to motor 76 when the rods 70 and 72 are in the proper position to divert feed to either the left or right as required.

In operation of feeder 2, pulley 25 rotates on axle 24 through the action of drive mechanism 18. Since drive cable 26 is looped around pulley 25 and is, thereby, frictionally connected thereto, drive mechanism 18 propels feed trough 2 back and forth above feed area 5. Since chain 12 is fixed at point 15 relative to movable feed trough 2 by cable 30 and stationary plate 32, when trough 2 moves, there is created, in a manner known to the art, relative movement between trough 2 and chain 12 and flights 14. For example, as trough 2 moves in either direction of chain 12 it moves relative to the trough and that portion of the chain originally within the trough passes below it thereby discharging material from the end of the trough.

When dead space 51 passes beneath feed chute 3, dead space 51 is positioned in the center of feed trough 2, However, any feed diverted to dead space 51 is removed by baffle 50 fore and aft of the baffle thereby preventing accumulation and the attendant spoilage of feed in space 51 and spillage over the side of the trough.

We claim as our invention:

1. In an animal feeder to deposit animal feed into a feed area having a guide track extending along the feed area, an elongated feed carrier mounted for movement on the guide track, said feed carrier having a trough to receive feed material and a means for removing feed from said trough comprising a continuous conveyor loop longitudinally encircling said trough and means to define a fixed point beneath said trough whereby movement of the feed carrier produces relative movement between the trough and the loop, the improvement which comprises a stationary support member extending within said feed carrier longitudinally below said trough along the entire length of the guide track and means for connecting the fixed point of said conveyor loop to said longitudinal support member to define said fixed point.

2. An improved animal feeder as in claim 1 wherein said conveyor loop comprises a flat conveyor belt.

3. An improved animal feeder as in claim 1 wherein said conveyor loop comprises a chain and a plurality of spaced-apart flights attached to said chain.

4. An improved animal feeder as in claim 1 which includes a supporting frame structure having fixed ends to support said feed carrier and said stationary support member is rigidly connected to both ends of said supporting frame.

5. An improved animal feeder as in claim 1 wherein said stationary support member comprises a cable.

6. An improved animal feeder as in claim 5 wherein said connecting means comprises a plate and means to affix said cable support member to said plate.

7. An improved animal feeder as in claim 6 wherein anti-friction means are positioned along the side edges of said plate and extending over said edges to prevent engagement of the plate with the interior side walls of said feed carrier.

8. An improved animal feeder as in claim 7 wherein said anti-friction means comprises rotatable guide wheels.

9. An improved animal feeder as in claim 1 wherein said feed carrier comprises an elongated elevator having an open, trough top section and an enclosed, bottom conduit section, said loop longitudinally encircling said open trough and passing within said enclosed conduit and said stationary support is positioned longitudinally within said enclosed conduit.

10. An improved animal feeder as in claim 9 wherein said support member comprises a cable and said connecting means conprises a plate to which said cable and loop are affixed.

11. An improved animal feeder as in claim 10 wherein said support plate has a width slightly less than the width of the bottom conduit and includes guide wheels positioned on the side edges of said plate to prevent engagement of the plate with the side walls of the bottom conduit.

12. An improved animal feeder as in claim 9 wherein said cable is affixed to said plate near the side of the plate and the loop is affixed to said plate near the center of said plate.

13. An improved animal feeder as in claim 11 which includes an anti-friction member positioned on the bottom of said plate to minimize friction between the plate and the bottom of the enclosed conduit.

14. An improved animal feeder as in claim 11 wherein said conveyor loop comprises a chain and a plurality of spaced-apart flights attached to said chain.

15. An improved animal feeder as in claim 11 which includes a supporting frame structure having fixed ends to support said feed carrier and said cable is rigidly affixed to the ends of said frame structure.

16. In an animal feeder to deposit animal feed into a feed area having a guide track extending along the feed area, an elongated feed carrier mounted for movement on the guide track, said feed carrier having a trough to receive feed material from a feed source and means for removing feed from said trough wherein the removal means cannot discharge all of the feed present in the trough due to the inability of the feed carrier to move a distance sufficient to discharge all material deposited in the carrier thereby creating a movable dead spot in said trough, the improvement which comprises a baffle positioned over said dead spot, and stationary relative to the movable dead spot, to direct feed passed to the trough away from the dead spot thereby preventing feed from accumulating therein.

17. An improved animal feeder as in claim 16 wherein said baffle is a horizontal baffle and said feeder includes means for removing feed deposited on said baffle.

18. An improved animal feeder as in claim 16 wherein said removal means comprises a continuous conveyor loop longitudinally encircling said trough and having a fixed point beneath said trough wherein said baffle is affixed to said loop to extend over said dead spot at a height greater than the feed height in the trough.

19. An improved animal feeder as in claim 18 wherein said baffle is a substantially horizontal baffle and includes means for removing feed deposited on said baffle.

20. An improved animal feeder as in claim 19 wherein said baffle has downwardly turned forward and rear edges to prevent accumulation of feed beneath said baffle.

21. An improved animal feeder as in claim 20 wherein the side edges of said baffle extend over the side edges of said trough.

22. An improved animal feeder as in claim 18 wherein said conveyor loop comprises a chain and a plurality of flights attached to said chain and said baffle is affixed to said chain.

23. An improved animal feeder as in claim 18 wherein said removal means comprises a scraper positioned above said trough to remove feed on the baffle as the baffle passes below said scraper.

24. An animal feeder for selectively discharging feed into a feed area which comprises:
  i. an elongated feed carrier mounted for oscillating movement above said feed area;
  ii. means for passing feed into said feed carrier;
  iii. a discharge chute mounted on at least one end of said feed carrier;
  iv. means for removing feed from the feed carrier and passing the feed into said discharge chute;
  v. said discharge chute having a downwardly directed opening and comprising a. a rotatable support member positioned near the center of said chute;
  b. a directional baffle positioned in the bottom portion of the discharge chute and extending into the downwardly directed opening;
  c. said baffle mounted on said support member, and rotatable from a first position to a second position wherein said baffle diverts said feed in a first lateral direction or a second lateral direction respectively;
  d. a downwardly extending adjusting member connected to said baffle and movable laterally to adjust the position of said baffle; and
  e. means for engaging said rod to adjust said baffle in response to the oscillating movement of the feed carrier, said engaging means comprising
    i. a stationary horizontal guide track transversely positioned below said feed carrier;
    ii. a transversely movable rod assembly mounted on said guide track, said rod assembly comprising a pair of spaced-apart, outwardly extending rods adapted to engage the baffle adjusting rod; and
    iii. means for moving said rod assembly on said track to selectively adjust the position of said baffle.

25. An animal feeder as in claim 24 wherein the rods of said rod assembly are positioned to provide a Y shaped structure.

26. An animal feeder as in claim 25 wherein a directional chute is positioned on each end of the feed carrier and said rod assembly is positioned on each side of the guide track to engage the adjusting rod of each directional chute.

27. An animal feeder as in claim 23 wherein said engaging means includes
  i. a drive motor having a drive shaft;
  ii. a first connecting member rigidly affixed to said drive shaft;
  iii. a second connecting member the top portion thereof movably affixed to said first connecting member to provide movement in a vertical direction relative to the first connecting member, said second member also being rotatable about a fixed point;
  iv. the bottom portion of said connecting member engaging said rod assembly to move said assembly laterally in a horizontal direction in response to the drive motor.

28. An animal feeder as in claim 27 which includes a pair of switches, one switch positioned on either side of the connecting members and responsive to contact with either of said connecting members to stop said drive motor when either of said connecting members contacts a switch thereby confining the rotation of the motor to a predetermined arc.

* * * * *